United States Patent [19]
Glaser

[11] Patent Number: 5,889,520
[45] Date of Patent: Mar. 30, 1999

[54] TOPOLOGICAL VIEW OF A MULTI-TIER NETWORK

[75] Inventor: Howard Justin Glaser, San Jose, Calif.

[73] Assignee: International Business Machines Corporation, Armonk, N.Y.

[21] Appl. No.: 970,169

[22] Filed: Nov. 13, 1997

[51] Int. Cl.⁶ .............................. G06F 3/14; G06F 15/16
[52] U.S. Cl. ..................... 345/349; 345/348; 345/356; 345/969; 395/200.54
[58] Field of Search ............................ 345/349, 356, 345/340, 969, 348; 395/200.54, 200.53

[56] References Cited

U.S. PATENT DOCUMENTS

| | | | |
|---|---|---|---|
| 4,545,011 | 10/1985 | Lyon et al. | 395/183.19 |
| 4,855,906 | 8/1989 | Burke | 707/10 |

OTHER PUBLICATIONS

Using Java & Applets for Multi–User Distributed Applications, Eric Evans, University of Texas, Jun. 1997.

An Embedded Visual Programming Interface for Intelligent Information Retrieval on the Web., Chungnan Lee, Yao–t-sung–Chen, Department of Management Information System, Feb. 1997.

Leveraging Java Applets: Toward Collaboration ransparency in Java, Begole, Struble, and Shaffer, Virginia Tech, Apr. 1997.

*Primary Examiner*—Raymond J. Bayerl
*Assistant Examiner*—Thomas Nguyen
*Attorney, Agent, or Firm*—Merchant, Gould, Smith, Edell, Welter, & Schmidt

[57] ABSTRACT

A method, apparatus, and article of manufacture for displaying a multi-tiered network configuration in a programming development environment supporting the development of Internet and Intranet applications. More specifically, a topological view of a multi-tier network configuration displayed in a window on a display screen connected to a computer. A visual representation is assigned to each application file in each tier to graphically represent the application file in the display window. Also, the visual representations for each tier are displayed in a designated portion of the display window.

45 Claims, 7 Drawing Sheets

TOPOLOGICAL VIEW OF A MULTI-TIER NETWORK

CROSS-REFERENCE TO RELATED APPLICATIONS

This application is related to the following co-pending and commonly-assigned patent applications:

Application Ser. No. 08/828,481, entitled "MULTI-TIER DEBUGGING," filed Mar. 31, 1997, by Daniel E. House and Constance J. Nelin, attorney's docket number ST997036;

Application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed Mar. 31, 1997, by Daniel E. House, Brian J. Owings, and Shiau-Shiau Pei, attorney's docket number ST997027;

Application Ser. No. 08/828,989, entitled "METHOD AND APPARATUS FOR SIMULATING A MULTI-TIERED COMPUTER ENVIRONMENT," filed Mar. 31, 1997, by Daniel E. House and Constance J. Nelin, attorney's docket number ST997021;

Application Ser. No. 08/828,478, entitled "MULTI-TIER VIEW PROJECT WINDOW," filed Mar. 31, 1997, by Howard J. Glaser, Daniel E. House, and Constance J. Nelin, attorney's docket number ST997022;

Application Ser. No. 08/828,846, entitled "SHARED MODULES GRAPHICAL USER INTERFACE," filed Mar. 31, 1997, by Howard J. Glaser, Daniel E. House, and Constance J. Nelin, attorney's docket number ST997025; and Application Ser. No. 08/828,890, entitled "HTML INTEGRATION UTILITY FOR A PROGRAM DEVELOPMENT ENVIRONMENT," filed Mar. 31, 1997, by Howard J. Glaser, attorney's docket number ST997028; and all of which applications are incorporated by reference herein.

BACKGROUND OF THE INVENTION

1. Field of the Invention

This invention relates in general to programming development environments performed by computers, and in particular, to a method and apparatus for displaying a topological view of a multi-tier network configuration.

2. Description of Related Art

With the fast growing popularity of the Internet and Intranets, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American Nationals Standard Organization (ANSI) and the International Standards Organization (ISO).

Thus, there is a need in the art simplified development environments for RDBMS software across an Internet or Intranet, and especially via Web-based networks. Further, there is a need for a simplified view of the network connectivity, activities, and performance. This information is used for load balancing and resource allocation to improve the performance of the network and "fine tune" the applications under development. There is also a need for a tool that may also be used in production environments to identify the network performance bottlenecks and optimize the network resources accordingly. The present invention satisfies those needs.

SUMMARY OF THE INVENTION

To overcome the limitations in the prior art described above, and to overcome other limitations that will become apparent upon reading and understanding the present specification, the present invention discloses a method, apparatus, and article of manufacture for displaying a multi-tiered network configuration in a programming development environment supporting the development of Internet and Intranet applications. More specifically, a topological view of a multi-tier network configuration displayed in a window on a display screen connected to a computer. A visual representation is assigned to each application file in each tier to graphically represent the application file in the display window. Also, the visual representations for each tier are displayed in a designated portion of the display window.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a multi-tier computer network architecture. The RAD tool provides an Integrated Development Environment (IDE) that is used to design, develop, deploy, and debug computer programming that accesses and displays data quickly and easily on the multi-tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
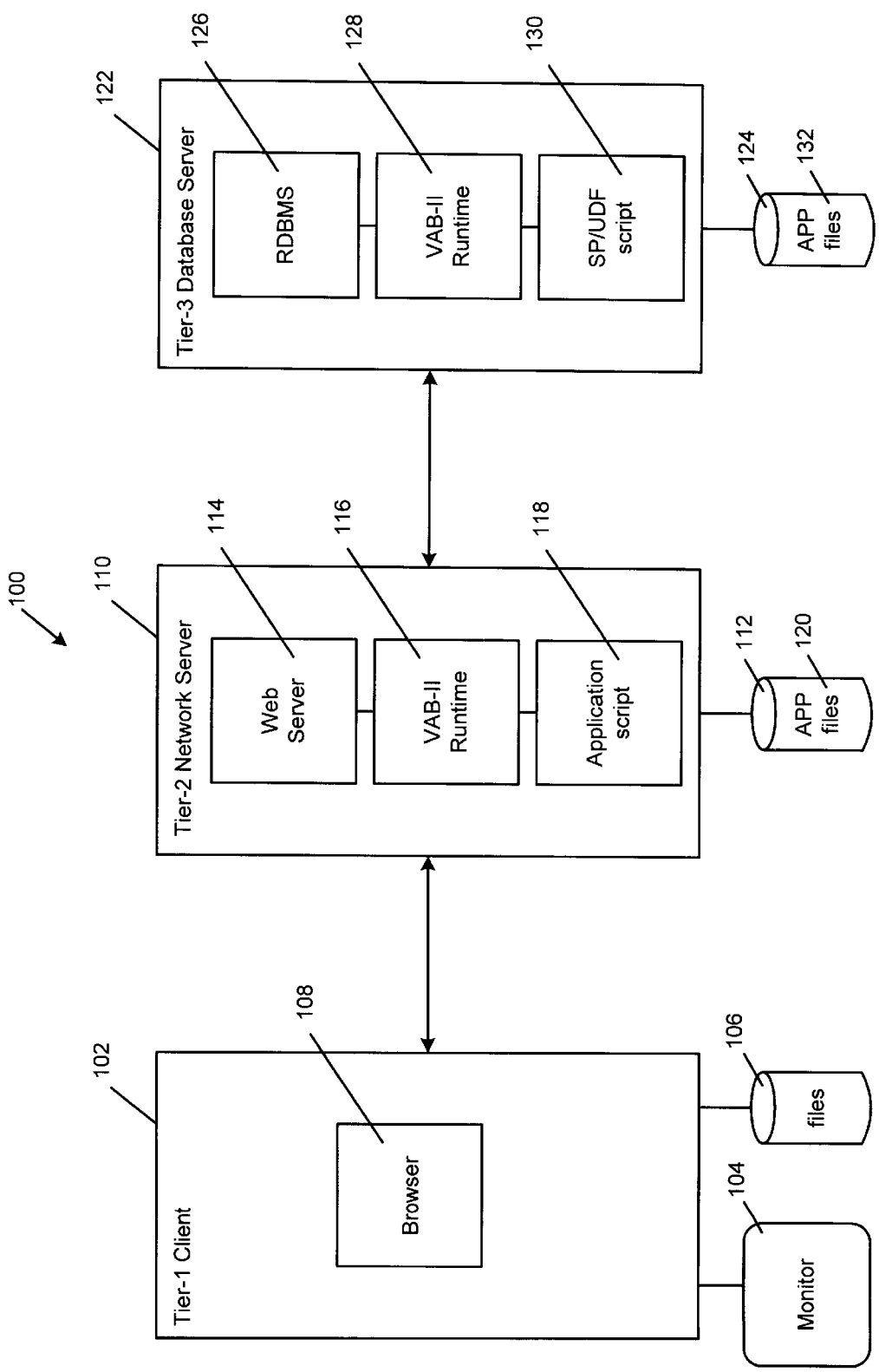
FIG. 1 is a block diagram that illustrates a three tier architecture.

FIG. 1 is a block diagram that illustrates a three tier architecture 100. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier. The VAB-II runtime module 116 executes the application scripts 118 and communicates with the third tier. The application scripts 118 (such as Lotus Script scripts) can contain programming logic for communicating with both the browser 108 and the third tier. Application scripts 118 can include Basic programming instructions, Java, ActiveX, or DLL applet controls, embedded SQL, and other mechanisms, alone or in combination.

The third tier comprises a database server 122 having one or more data storage devices 124 connected thereto. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from an APP file 132 stored on a data storage device 124. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF scripts 130. The SP/UDF scripts 130 comprise programming logic for accessing the database via the RDBMS 126 and communicating with the tier-2 computer programs.

Figure 2:
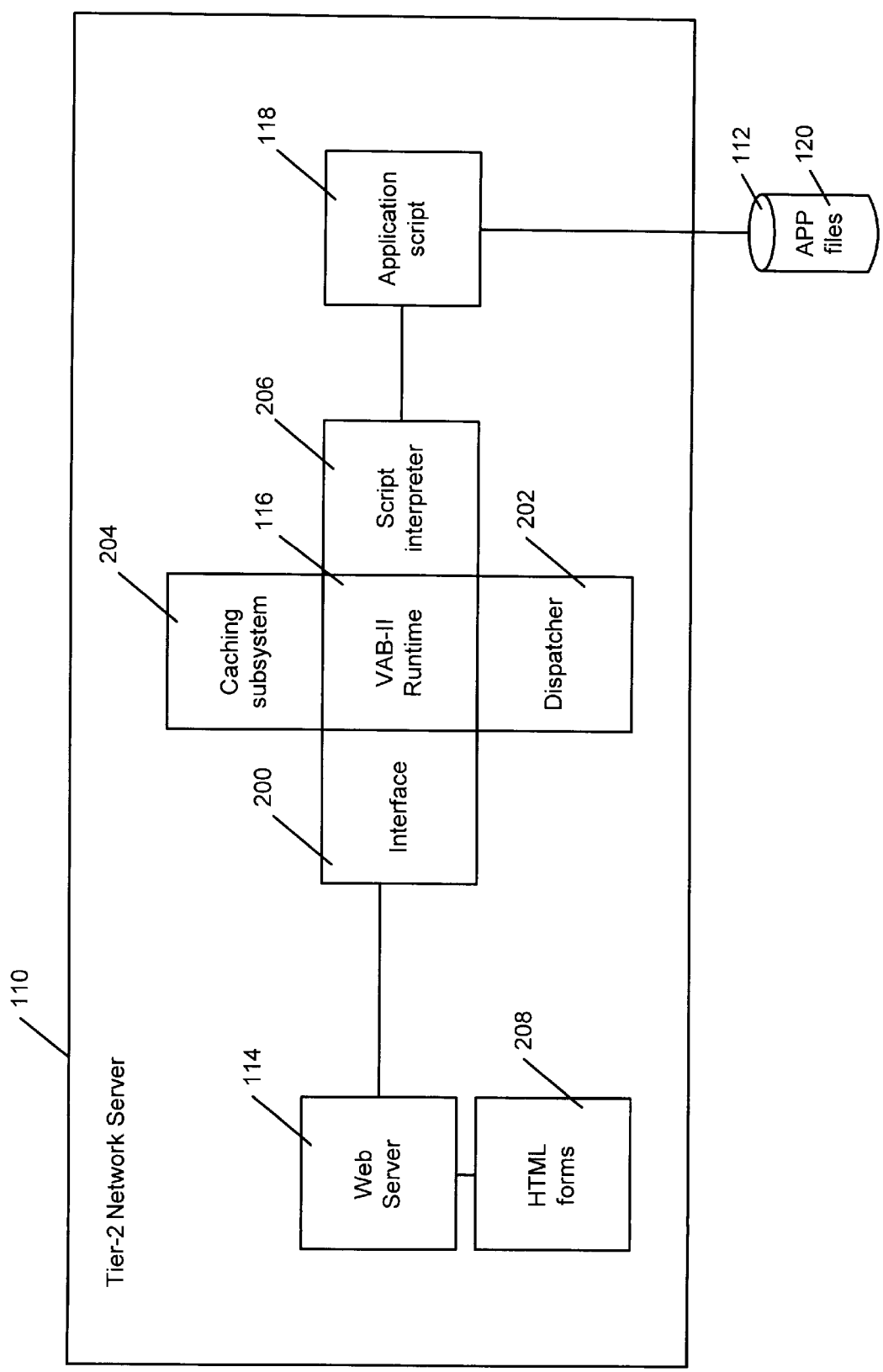
FIG. 2 is a block diagram that illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
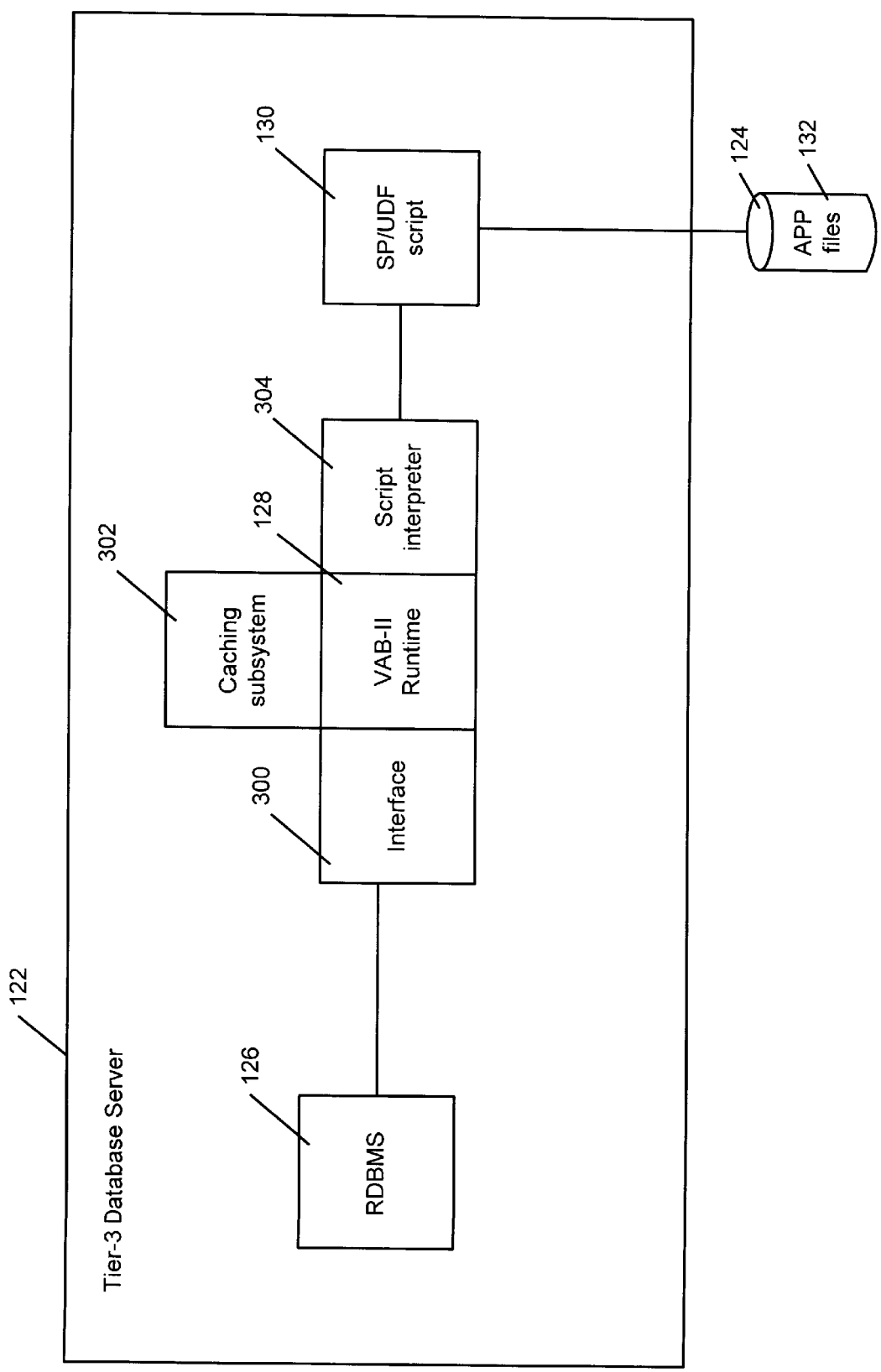
FIG. 3 is a block diagram that illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 retrieved from one or more APP files 132 store on the data storage device 124. No dispatcher is required for the VAB-II runtime module 128 in the database server 122. The interface 300 provides a mechanism for invoking the database server 126 from the VAB-II runtime module 128 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform 134 or in some combination thereof. Each of the computers may include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
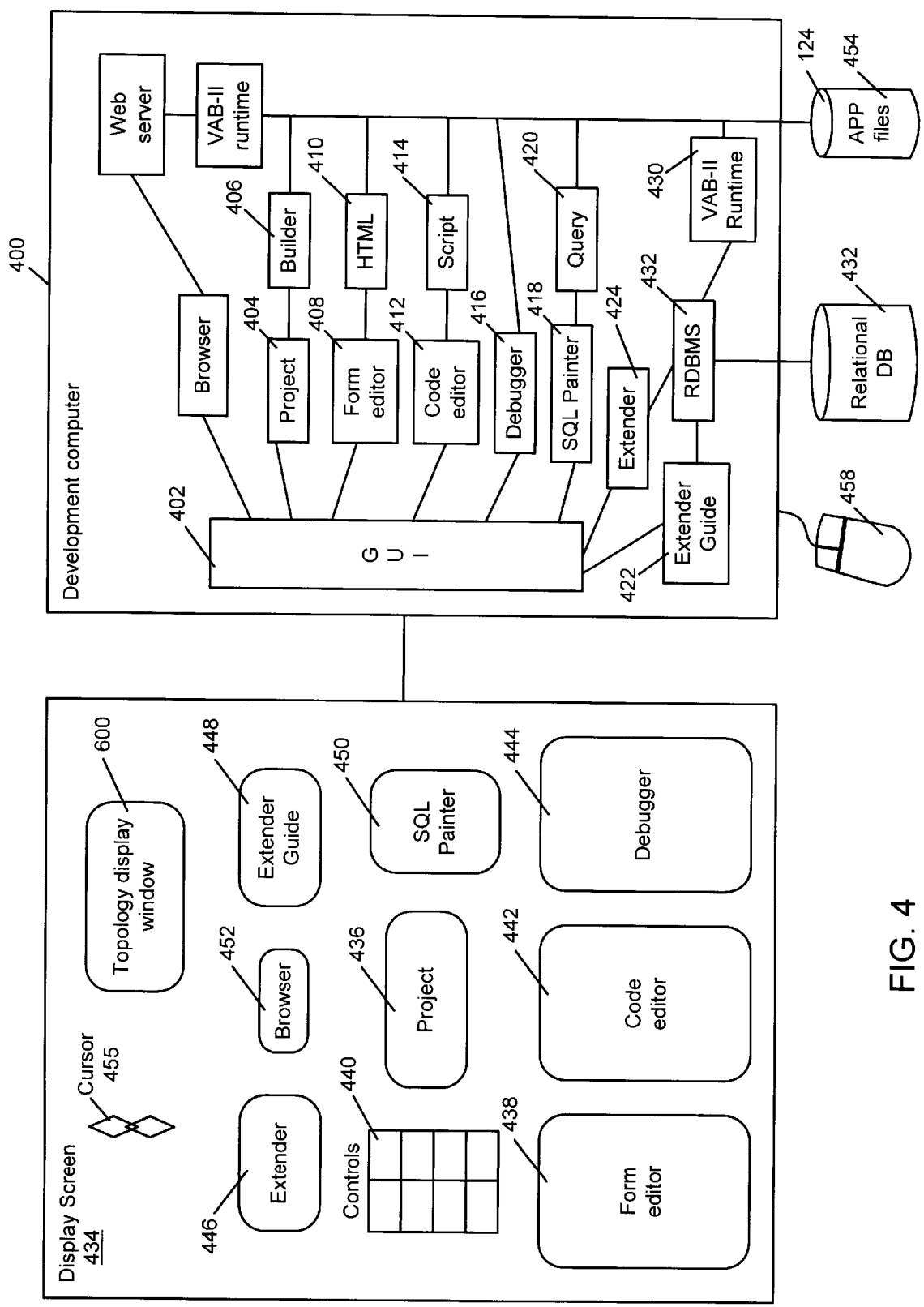
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, RDBMS 432, and a mouse 458. The RAD tool displays a user interface on a display screen 434 attached to the development computer 400, which includes, inter alia, a project window 436, form editor window 438, control pad 440, code editor window 442, debugging window 444, extender user interface window 446, extender guide window 448, SQL painter window 450, a browser window 452, a mouse cursor 455, as well as a topology display window 600.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Application (APP) File

Figure 5:
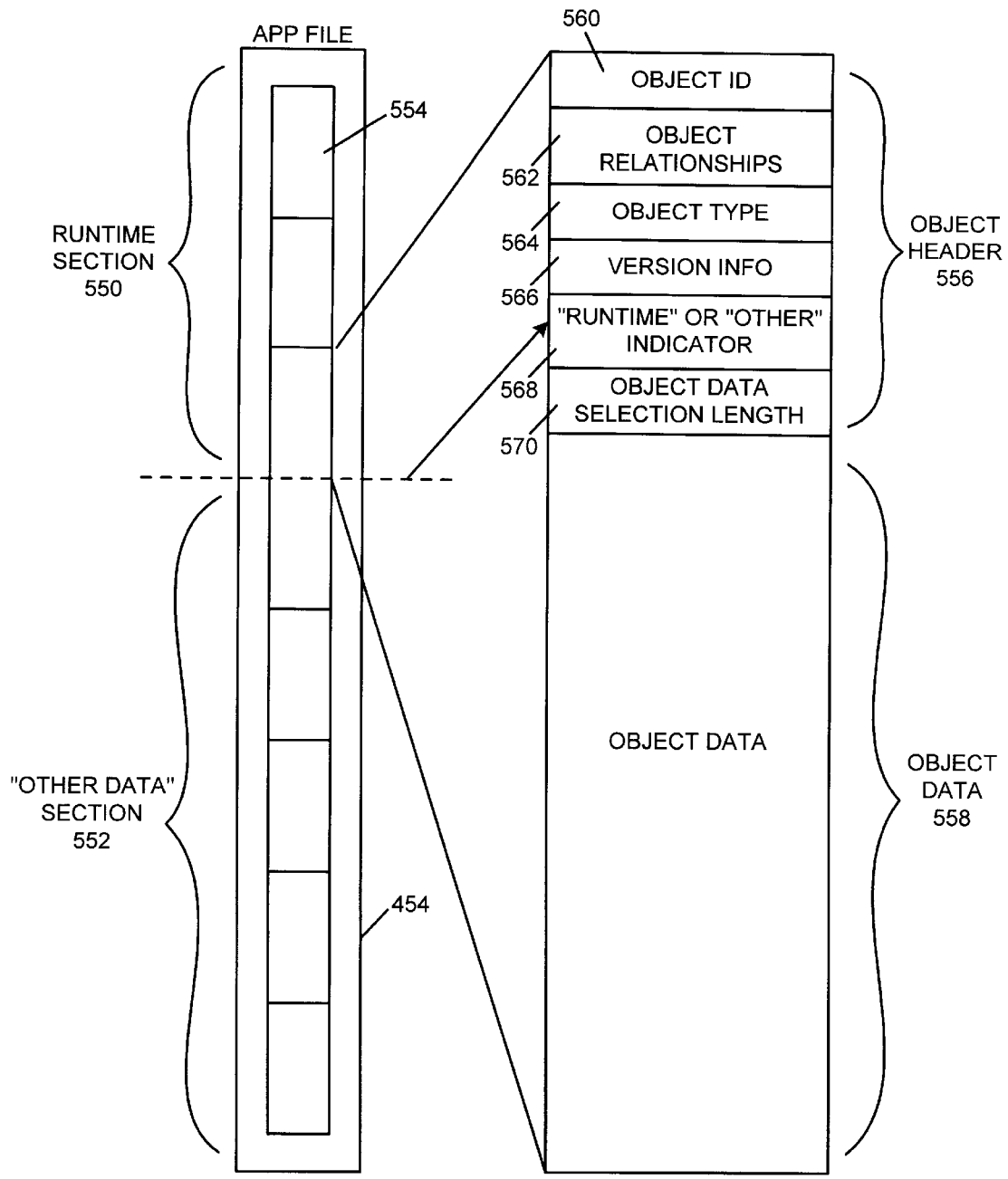
FIG. 5 is a diagram depicting the structure of the application file of the present invention.

FIG. 5 is a block diagram that illustrates an APP file constructed by the development environment according to the present invention.

The APP file 454 contains all of the data and structures that represent a software project in the present invention including: project-related data such as information on the application for the tier-2 network server 110, stored procedures (SPs) or user-defined functions (UDFs) for the tier-3 database server 122, source code (optionally), event logic controls, forms, and relationships among all of these things.

The APP file 454 encapsulates all of the objects that make up a project. From a single APP file 454, the project and all of its state can be recovered (state also includes such design time behavior as which form is currently active and where in a module the code editor was last positioned before the project was saved). The APP file 454 also enables the present invention to utilize a common mechanism for restoring a project across development machines, across executables, and across releases.

The APP file 454 describes the persistence mechanism for the Object Model that all components of the present invention are built upon. Although not humanly readable, the data structure of the APP file 454 is described as follows.

The APP file 454 comprises two major sections, a Runtime Section 550 and an Other Data section 552. The Runtime Section 550 contains all of the data needed primarily at "runtime," including executable programming logic. Data stored in the Runtime Section 550 is used to quickly and efficiently load information that is used to run an application. The second major section is The Other Data Section 552, which contains all other project related data, including project environment data (such as source code, design time properties, other project development data, etc.). By segmenting the APP file 454 into these two sections, the speed of execution is enhanced, because reading in the Other Data Section 552 can be skipped when executing an application.

Each of the major sections is further segmented into a series of minor sections 554 (a variable number of them), with each minor section containing information about one object in the VAB-II Object Model. For example, one minor section 554 may represent the OMProject object, another minor section could represent a particular Form object within it, etc.

Since the Object Model used in the present invention is a tree structure, the APP file 454 must represent this information. A node in a tree can have "n" children and "m" siblings (internally, a sibling relationship may be represented as a singly linked list, in which case a node would appear to have at most one sibling).

When in memory, relationships such as child or sibling can be represented simply by a memory pointer to an object. However, when encapsulated inside a APP file 454, pointers to memory have no meaning. The present invention solves this problem by instead representing information describing relationships between objects inside the APP file 454 using Object IDs 560 and Object Relationships 562.

Each object in the Object Model has an Object ID 560. Instead of using memory pointers, the APP file 454 uses these Object IDs 560 to store relationships between the objects. That is, instead of saving memory pointers in the APP file 454, the relationship is stored. For example, although not stored or interpreted in the English form below, the relationship may comprise the following: "ObjectID-5 has-child ObjectID-19."

For every object in the Runtime Section 550 or the Other Data Section 552, there is an Object Header 556 and Object Data 558. The Object Header 556 comprises the following types of information: ObjectID 560, relationships 562, such as Has-Child(ObjectID) and Has-Sibling(ObjectID), Object Type 564 (e.g., Form), VersionInformation 566, Runtime-OrOther indicator 568 used to determine where the Runtime Section stops and the Other Data Section begins, and length of the Object Data Section 570.

The Object Data Section 558 contains a stream of information that has meaning only to the particular Object Type. For example, an Object Type of Form will have in its Object Data Section 558 properties of the Form object (such as size, color, etc.). For speed and efficiency, these data are in "stream" format. That is, it is written in an order that is determined by the Object and read back in the exact same order (as opposed to writing name-value pairs that could be read and written in any order, but at the expense of extra space and time to parse the information when reading).

As an example of streaming, suppose that an object has property Color=Red and Size=15. The Object data section would have "red 15" in it. It is up to the Object Type object to know that it wrote the order Color then Size and must read it back in the same way. An alternative would have been to write "Color=Red, Size=15" into the Object Data. This alternative would: (1) take up more space, and (2) require that the data be parsed when read it (that is, when reading a APP file and reconstructing the Object, the data could be read in the reverse order (size then color), because a name-value pair was saved). While more flexible, there is a high performance penalty to be paid for this when large numbers of properties are involved.

From the foregoing, it can be seen that the data structure and use of the APP file 454 has numerous advantages. First, the APP file 454 uses a hybrid format in that it is partly name-value based (the Object Header Section) and partly stream based (the Object Data Section). This allows for flexibility, very high speed, and low space or storage capacity requirements. In addition, because the data structure of the APP file 454 segments the information into a Runtime Section 550 and an Other Data Section 552, it allows for even higher speed when the APP file 454 is being read for the purpose of executing an application (as opposed to reading an APP file 454 to continue developing the application).

Another advantage of the data structure of the APP file 454 is that the APP file 454 contains all data required for a project. Other development tools typically keep many files that represent a project, resulting in the disadvantages discussed herein. Still another advantage of the APP file 454 is that it contains a persistent representation of the Object Model, which allows for a common code base among many parts of the present invention (such as Builder, Runtime, Control Pad, and others).

Topological View of a Multi-tier Network

Figure 6:
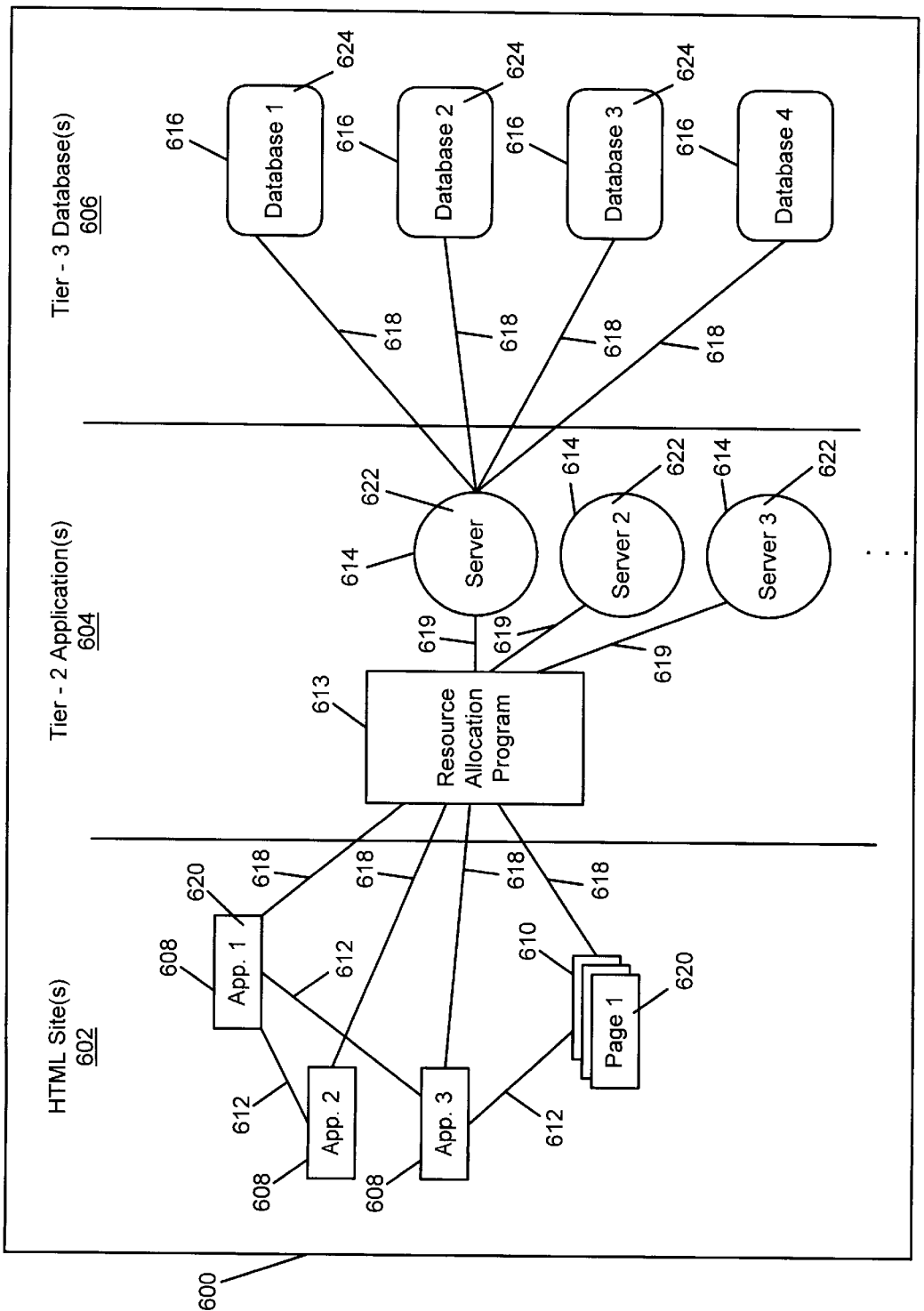
FIG. 6 illustrates a graphical display of the topographical view for one embodiment of the present invention.

FIG. 6 illustrates a graphical display of the topographical view for one embodiment of the present invention. The display window 600 comprises three portions; a first portion 602 representing HTML sites, a second portion 604 is for tier-2 applications, and a third portion 606 represents the tier-3 databases. In this illustration, first portion 602 of the topology display window 600 is designated to tier-2 as HTML sites and the application files 454 are visually represented as HTML icons 608 and alphanumeric labels 620 within first portion 602. HTML icon 610 within first portion 602 comprises a hierarchical or other display of a project and its components stored in the application file 454. The application files 454 may include, but are not limited to: HTML pages, stored procedures, user-defined functions, and database queries.

Portion 604 in the topology display window 600 is designated as a "Tier 2 Applications" portion and includes a server visually represented as a server icon 614 and alphanumeric label 622. Portion 604 may also additionally comprise additional servers visually which are also represented by a server icon 614 and an appropriate alphanumeric label 622. Portion 604 may also comprise a resource allocation module or program icon 613, which represents a resource allocation capability for controllingly interfacing with multiple application servers.

Portion 606 in the topology display window 600 is designated as "Tier 3 databases" and includes a number of databases visually represented by database icons 616 and alphanumeric labels 624.

The path that data travels between any two network nodes or any two files is called a data path. The data paths between the application files 454 and the data paths between the tiers are also visually represented in the topology display window 600. In this example, the data paths between the application files and between the different tiers are depicted by lines 612 and lines 618, respectively. Data paths between the resource allocation program and the servers are depicted by lines 619. If there is no resource allocation program (which may occur for example if there is a single application server in tier 2), lines 618 extend directly from tier 1 to the server icon 614.

The graphical display icons used in FIG. 6 are for representation only; other visual representations, icon shapes, or icon sizes may be used for this invention.

When developers create an application, it is deployed to a database server 122. This is referred to as "building" the application. The present invention allows the developers and other users to see a visual representation of these built applications and the database(s) in which the applications are deployed. Further, each application file 454 contains all of the data and structures that represent a software project in the present invention including: project related data such as information on the application scripts, SP/UDF scripts, source code, and hierarchical relationships among all of these project related data.

The invention retrieves a data structure containing information for each application file 454. The information includes data paths and connectivity relationships among the application files. The data structure also includes information about each tier and the relationships among the tiers. Database paths may be determined by iterating through the application file 454 to find connect statements in the application file 454 containing database parameters or properties such as the database name, and schema, and to determine logical connections between databases and other elements.

For instance, if a user positions the cursor 455 over a particular icon (icon 610 in this case), and clicks on the mouse 458 button, a detailed hierarchical information related to the particular application file will appear on the topology display window 600. A tier icon can also be expanded to graphically display more detailed hierarchical information about that tier. For example, the HTML site in FIG. 6 can be expanded to display all the HTML pages included in that site. This detailed information related to a particular application file or a particular tier is referred to as "nested information" and is depicted by the nested icon 610 in FIG. 6.

The present invention also allows a user to view multi-tier network performance parameters including performance parameters for all of the databases that are being used at a given time for a particular application. The invention displays a graphical representation of the network performance including the performance of the database(s) within the network in the topology display window 600. Load analysis and impact analysis can be visually displayed in a designated portion of the topology display window 600.

Impact analysis enables developers or users to view the impact of breaking down of any network module or resource by providing a view of all the modules and resources that are connected within the multi-tier network. For example, when a web-page is used to access different databases, a view of which database is feeding that web-page is displayed, which may be used to analyze the impact of adding or subtracting more database(s).

Load analysis breaks down the major components and links in the network into segments to identify bottlenecks and problems with the different segments and data paths. Load analysis can also be used for load balancing and trying out various means of application programming and the data access methods thereof. The performance information is obtained from the network manager, database manager(s), and/or web manager(s). Next, statistic data is derived from the performance information. This statistic data is then visually displayed in a designated portion of the topology display window 600.

For example, values for network or database(s) performance can be displayed next to the related data paths 618, or animated symbols (for instance, dashed lines 626) may be visually displayed to represent movement of application files and data across different tiers or between application files within a tier. The rate that these animated symbols move along the data paths (solid lines 618), their colors, or their thicknesses may vary according to the performance and data transfer rate of the network.

Figure 7:
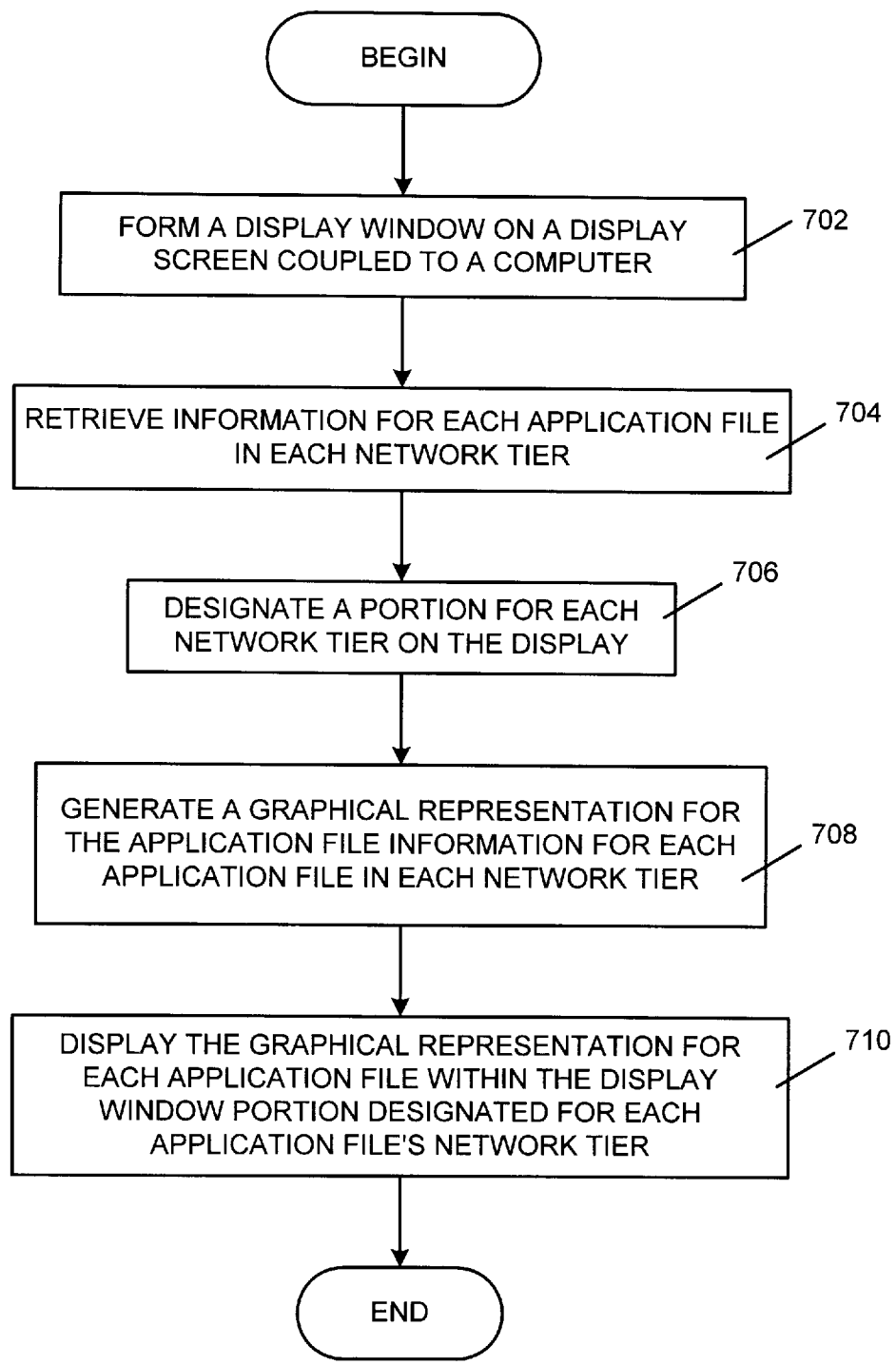
FIG. 7 is a flow chart illustrating the operations performed in connection with the present invention.

FIG. 7 is a flow chart describing the method steps of the present invention. First, a display window is formed 702 on a display screen coupled to a computer. Next, as represented in block 704, information is retrieved for each application file in each network tier. A portion of the display is designated on the display for each network tier in block 708. Next, a graphical, iconic, or other representation for the application file is generated 708 for the application file information for each application file in each network tier. Finally, as shown in block 710, the graphical representation for each application file is displayed within the display window portion designated for each application file's associated network tier.

In summary, the present invention discloses a method, apparatus, and article of manufacture for providing a programming development environment that supports the development of Internet and Intranet applications. More specifically, a topological view of a multi-tier network configuration is displayed in a display window on a display screen connected to a computer. A visual representation is assigned to each application file in each tier to graphically represent the application file in the display window. Also, the visual representations for each tier are displayed in a designated portion of the display window.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of graphically displaying a topological view of a multi-tier network having at least one application file and at least one data source, comprising the steps of:

when storing each application file, identifying data paths representing relationships between each application file and each data source accessed by each application file;

storing each application file with the identified data paths;

forming a display window on a display screen coupled to a computer;

retrieving information for each application file in each network tier, the information comprising data and structures representing a software project in the multi-tier network and comprising the identified data paths;

designating a portion on the display window for each network tier;

generating a graphical representation for the application file information for each application file in each network tier and for the identified data paths; and displaying the graphical representation for each application file within the display window portion designated for each application file's network tier with the identified data paths.

2. The method of claim 1, wherein the graphical representation is selected from a group comprising an icon and an alphanumeric label.

3. The method of claim 1, further including the step of changing the graphical representations based on changes to the information.

4. The method of claim 1, wherein the data paths represent relationships between the network tiers.

5. The method of claim 4, wherein the data paths between the network tiers are visually represented by lines connecting the corresponding network tiers.

6. The method of claim 1, wherein the data paths represent relationships between application files.

7. The method of claim 6, wherein the data paths between the application files are visually represented by lines between the corresponding application files.

8. The method of claim 1, wherein the graphical representation of an application file comprises a hierarchical display of a project and its components stored in the application file.

9. The method of claim 1, wherein nested information for an application file is displayed by invoking the visual representation of the application file.

10. The method of claim 9, wherein the step of invoking the visual representation of the application file comprises the steps of:

positioning a cursor on the application file; and clicking on a mouse button.

11. The method of claim 1, further including the step of displaying a graphical representation of the multi-tier network performance.

12. The method of claim 11, wherein the step of displaying a graphical representation of the multi-tier network performance comprises the steps of:

retrieving a data structure containing performance information for the multi-tier network;

associating a visual representation to the performance information for each network tier;

designating a portion in the display window;

displaying the visual representations for each tier on the designated portion; and changing the visual representations based on changes to the multi-tier network performance.

13. The method of claim 1, wherein one of the tiers is a database server.

14. The method of claim 1, wherein the multi-tier network consists of a three-tier web-based network having a network server as the second tier and a database server as the third tier.

15. The method of claim 14, wherein the application files comprises one or more elements selected from a group comprising:

a HTML page;

a stored procedure;

an user defined function; and a database query.

16. An apparatus for graphically displaying a topological view of a multi-tier network configuration, comprising:

a computer having a display screen;

means, performed by the computer, for, when storing application files, identifying data paths representing relationships between each application file and each data source accessed by each application file;

means, performed by the computer, for storing each application file with the identified data paths;

means, performed by the computer, for forming a display window on the display screen;

means, performed by the computer, for retrieving information for each of the plurality of application files in each network tier;

means, performed by the computer, for assigning a visual representation to the information for each of the plurality of application files in each network tier and to the identified data paths, wherein each visual representation is a graphical representation of each application file in each network tier;

means, performed by the computer, for designating a portion on the display window for each of the network tiers; and means, performed by the computer, for displaying the visual representation related to each application file in a particular network tier on the designated portion of the display window for the particular network tier with the identified data paths.

17. The apparatus of claim 16, wherein the graphical representation is selected from a group comprising an icon and an alphanumeric label.

18. The apparatus of claim 16, further including the means for changing the graphical representations based on changes to the information.

19. The apparatus of claim 16, wherein the data paths represent relationships between the network tiers.

20. The apparatus of claim 19, wherein the data paths between the network tiers are visually represented by lines connecting the corresponding network tiers.

21. The apparatus of claim 16, wherein the data paths represent relationships between application files.

22. The apparatus of claim 21, wherein the data paths between the application files are visually represented by lines between the corresponding application files.

23. The apparatus of claim 16, wherein the graphical representation of an application file comprises a hierarchical display of a project and its components stored in the application file.

24. The apparatus of claim 16, wherein nested information for an application file is displayed by invoking the visual representation of the application file.

25. The apparatus of claim 24, wherein the means for invoking the visual representation of the application file comprises:

means for positioning a cursor on the application file; and means for clicking on a mouse button.

26. The apparatus of claim 16, further including the means for displaying a graphical representation of the multi-tier network performance.

27. The apparatus of claim 26, wherein the means for displaying a graphical representation of the multi-tier network performance comprises:

means for retrieving a data structure containing performance information for the multi-tier network;

means for associating a visual representation to the performance information for each network tier;

means for designating a portion in the display window;

means for displaying the visual representations for each tier on the designated portion; and means for changing the visual representations based on changes to the multi-tier network performance.

28. The apparatus of claim 16, wherein one of the tiers is a database server.

29. The apparatus of claim 16, wherein the multi-tier network consists of a three-tier web-based network having a network server as the second tier and a database server as the third tier.

30. The apparatus of claim 29, wherein the application files comprises one or more elements selected from a group comprising:

a HTML page;

a stored procedure;

an user defined function; and a database query.

31. An article of manufacture comprising a program storage medium readable by a computer having a display screen and embodying one or more instructions executable by the computer to perform method steps for graphically displaying a topological view of a multi-tier network configuration having a plurality of application files and at least one data source, the method comprising the steps of:

when storing each application file, identifying data paths representing relationships between each application file and each data source accessed by each application file;

storing each application file with the identified data paths;

forming a display window on the display screen;

retrieving information for each of the plurality of application files in each network tier;

assigning a visual representation to the information for each of the plurality of application files in each network tier and to the identified data paths, wherein each visual representation is a graphical representation of each application file in each network tier;

designating a portion on the display window for each of the network tiers; and displaying the visual representation related to each application file in a particular network tier on the designated portion of the display window for the particular network tier with the identified data paths.

32. The article of manufacture of claim 31, wherein the graphical representation is selected from a group comprising an icon and an alphanumeric label.

33. The article of manufacture of claim 31, further including the step of changing the graphical representations based on changes to the information.

34. The article of manufacture of claim 31, wherein the data paths represent relationships between the network tiers.

35. The article of manufacture of claim 34, wherein the data paths between the network tiers are visually represented by lines connecting the corresponding network tiers.

36. The article of manufacture of claim 31, wherein the data paths represent relationships between application files.

37. The article of manufacture of claim 36, wherein the data paths between the application files are visually represented by lines between the corresponding application files.

38. The article of manufacture of claim 31, wherein the graphical representation of an application file comprises a hierarchical display of a project and its components stored in the application file.

39. The article of manufacture of claim 31, wherein nested information for an application file is displayed by invoking the visual representation of the application file.

40. The article of manufacture of claim 39, wherein the step of invoking the visual representation of the application file comprises the steps of:

positioning a cursor on the application file; and clicking on a mouse button.

41. The article of manufacture of claim 31, further including the step of displaying a graphical representation of the multi-tier network performance.

42. The article of manufacture of claim 41, wherein the step of displaying a graphical representtion of the multi-tier network performance comprises the steps of:

retrieving a data structure containing performance information for the multi-tier network;

associating a visual representation to the performance information for each network tier;

designating a portion in the display window;

displaying the visual representations for each tier on the designated portion; and changing the visual representations based on changes to the multi-tier network performance.

43. The article of manufacture of claim 31, wherein one of the tiers is a database server.

44. The article of manufacture of claim 31, wherein the multi-tier network consists of a three-tier web-based network having a network server as the second tier and a database server as the third tier.

45. The article of manufacture of claim 44, wherein the application files comprises one or more elements selected from a group comprising:

a HTML page;

a stored procedure;

an user defined function; and a database query.

\* \* \* \* \*